United States Patent

Maestripieri

[11] Patent Number: 5,833,258
[45] Date of Patent: Nov. 10, 1998

[54] FLEXIBLE FRAME FOR BICYCLES, MOPEDS OR MOTORCYCLES

[76] Inventor: Osvaldo A. Maestripieri, Dr. E. Lobos 201/5, Buenos Aires, Argentina, 1405

[21] Appl. No.: 799,705

[22] Filed: Feb. 11, 1997

[30] Foreign Application Priority Data

Mar. 25, 1996 [AR] Argentina ............................. 335895

[51] Int. Cl.⁶ .................................................. B62K 19/04
[52] U.S. Cl. ............................................ 280/275; 280/283
[58] Field of Search ................................. 280/274, 275, 280/281.1, 283, 284

[56] References Cited

U.S. PATENT DOCUMENTS

| | | | |
|---|---|---|---|
| 579,042 | 3/1897 | Clark | 280/283 |
| 593,046 | 11/1897 | Dahl | 280/283 |
| 701,967 | 6/1902 | Titus | 280/283 |
| 4,669,747 | 6/1987 | Groendal | 280/283 |
| 4,792,150 | 12/1988 | Groendal et al. | 280/283 X |
| 5,080,384 | 1/1992 | Groendal et al. | 280/281.1 X |
| 5,330,219 | 7/1994 | Groendal et al. | 280/283 X |
| 5,498,013 | 3/1996 | Hwang | 280/283 |

*Primary Examiner*—Kevin Hurley

[57] ABSTRACT

Flexible frame for bicycles, mopeds or motorcycles, that enables the cycle to absorb road flawness, by means of smooth deformations of the system.

1 Claim, 15 Drawing Sheets

FLEXIBLE FRAME FOR BICYCLES, MOPEDS OR MOTORCYCLES

BACKGROUND OF THE INVENTION

1. Field of the Invention

The present invention relates to a bicycle frame, and more particularly to a structuraly flexible bicycle frame.

2. Description of the Prior Art

Typical bicycle frames comprise a top tube, a head tube, a down tube, a seat tube and a chain stay solidly fixed together, in a Cremona-type triangular configuration, so that the rider is subjected to a rigid and unyielding support which can be uncomfortable when the bicycle is ridden across rough surfaces.

Typical flexible frames make use of shock absorbing devices, flexible spring connections, fiberglass spring plates, steel cables, and other auxiliary devices added to an otherwise rigid structure to provide certain amount of resilience by means of relative rotation between different parts, or by lengthening or shortening of the added devices. Most prior known flexible frames have two clearly different parts interconnected, said parts being usually a front frame and a rear frame, admitting the absorption of shocks and vibrations only on one of them, or, at most, permitting relative movements between the portions. No one of them succeeds in providing an integral flexible system, capable of smoothly absorb even the most dramatic road flawness. Furthermore, the prior known constructions have suffered from a number of drawbacks such as having a huge amount of parts, and several non standard devices, making extremely complex its maintenance and service.

The object of the present invention is to provide a new bicycle frame construction solving the aforementioned problems. The present invention consists in a novel construction and combination of parts, in which the aforementioned Cremona-type triangles has been replaced by two jointed deformable quadrilaterals, the top tube has been replaced by an elastic bar hereinafter described, and makes no use of auxiliary shock absorbing devices, resulting in an intrinsically flexible structure capable of mitigate and/or eliminate shocks and vibrations by means of the whole deformation of the complete system.

DETAILED DESCRIPTION

Figure 1:
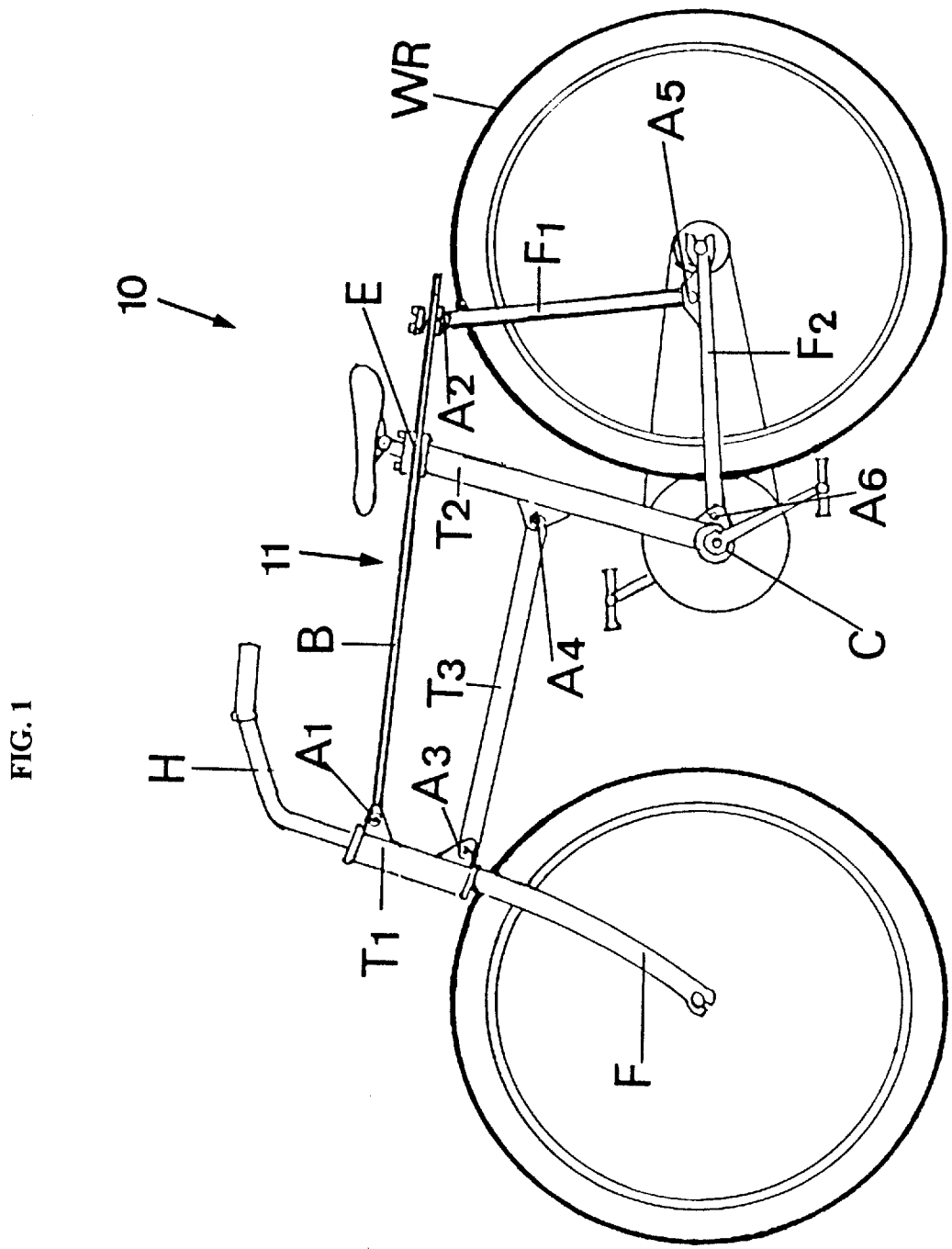
FIG. 1 is a side view of a bicycle embodying the flexible frame.
Figure 2:
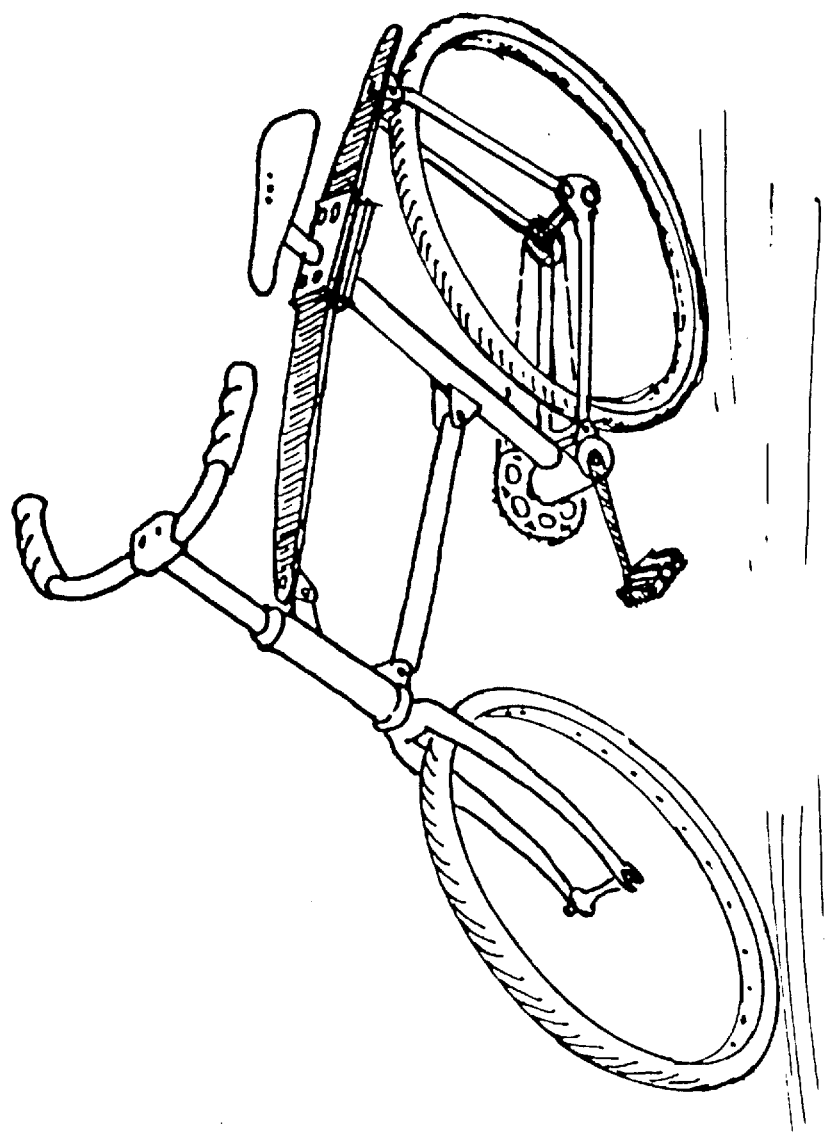
FIG. 2 is a side elevation view similar to FIG. 1 but with some degree of perspective.
Figure 3:
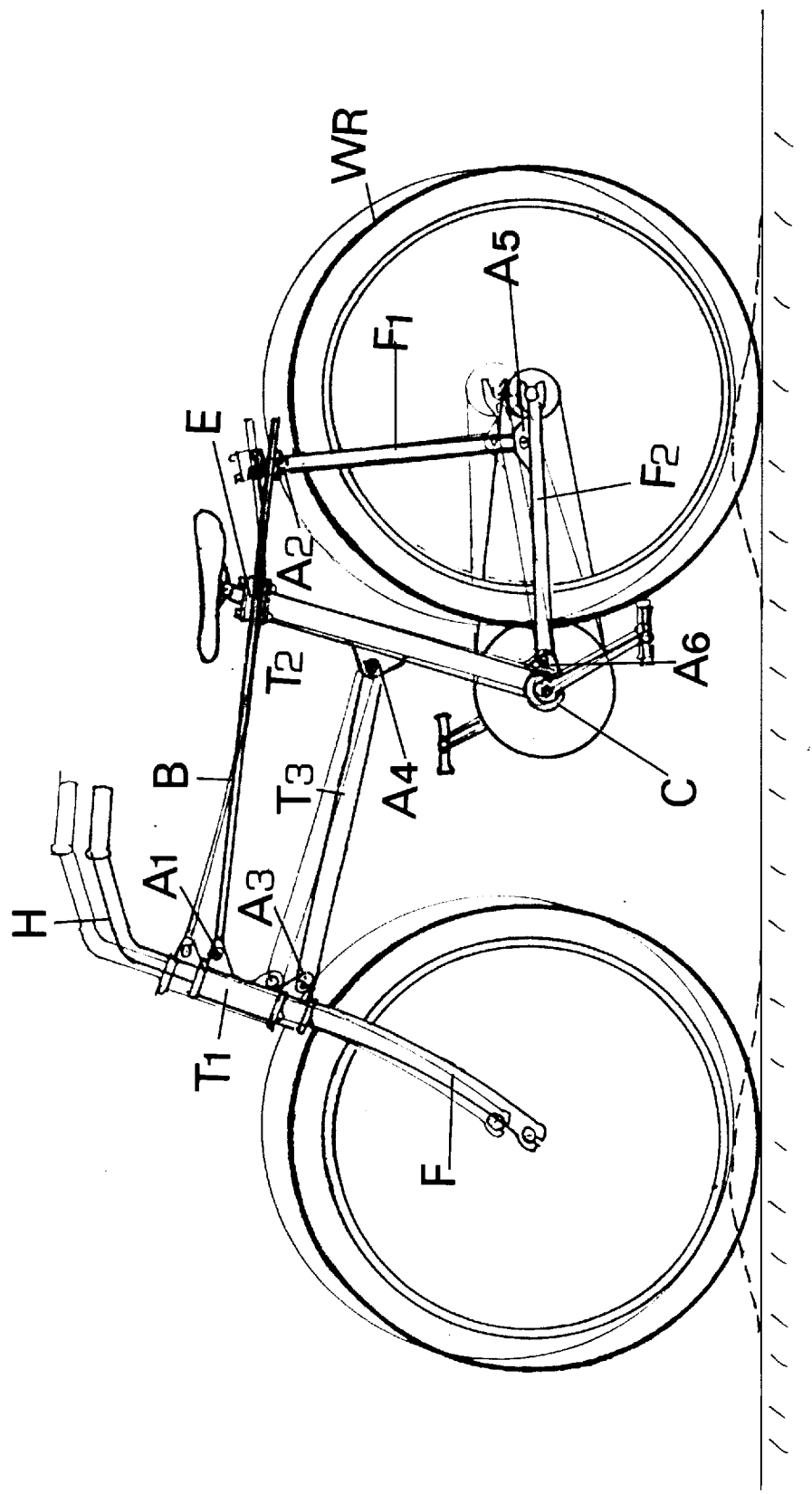
FIG. 3 is a schematic view illustrating the operation of the bicycle frame.
Figure 4:
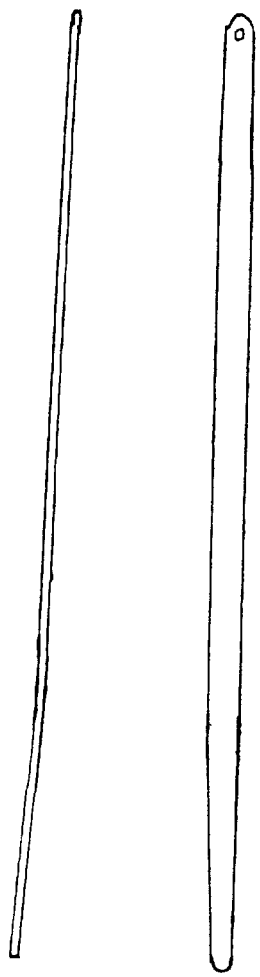
FIG. 4 shows a top view and a section of the elastic top bar.
Figure 5:
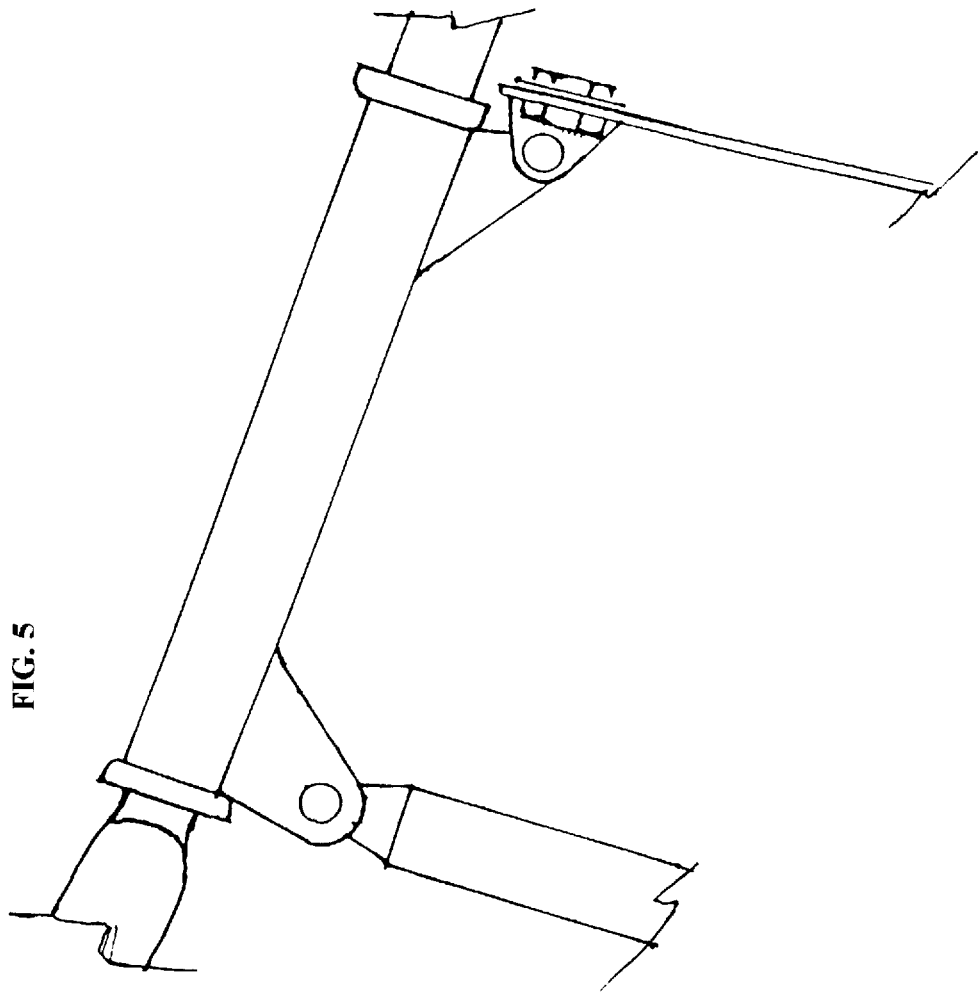
FIG. 5 is an enlarged side view of the steering tube articulations.
Figure 6:
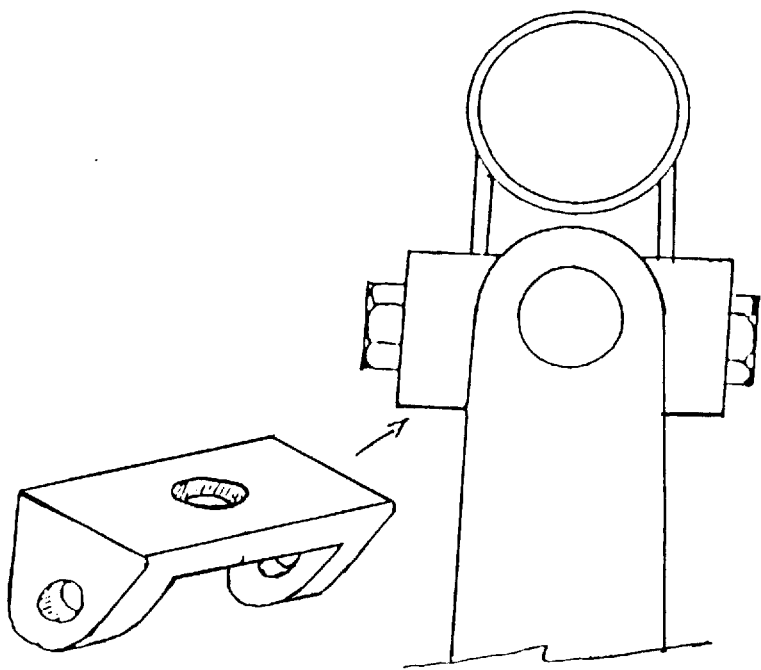
FIG. 6 is an enlarged top view of the articulation between the elastic top bar and the steering tube, showing a detail of the element connecting the elastic bar with the articulation.
Figure 7:
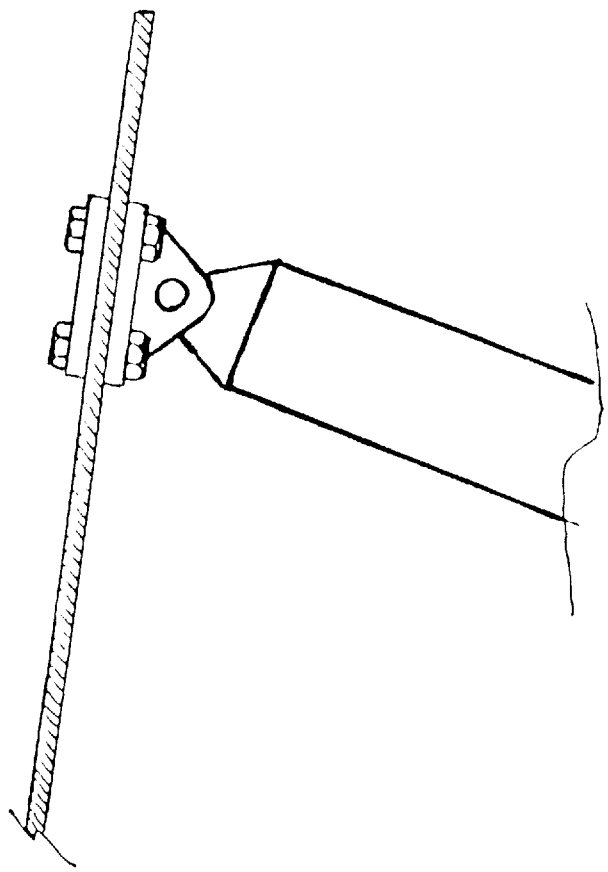
FIG. 7 is an enlarged side view of the articulation between the elastic top bar and the upper rear fork.
Figure 8:
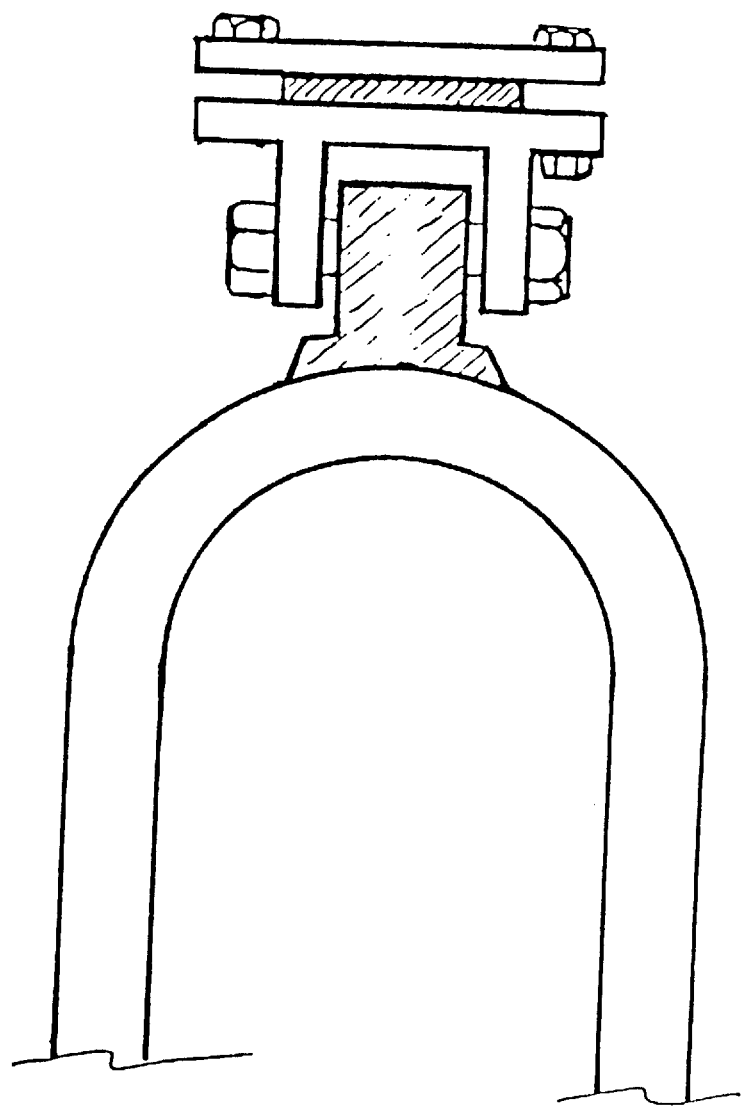
FIG. 8 is an enlarged front view of the FIG. 7.
Figure 9:
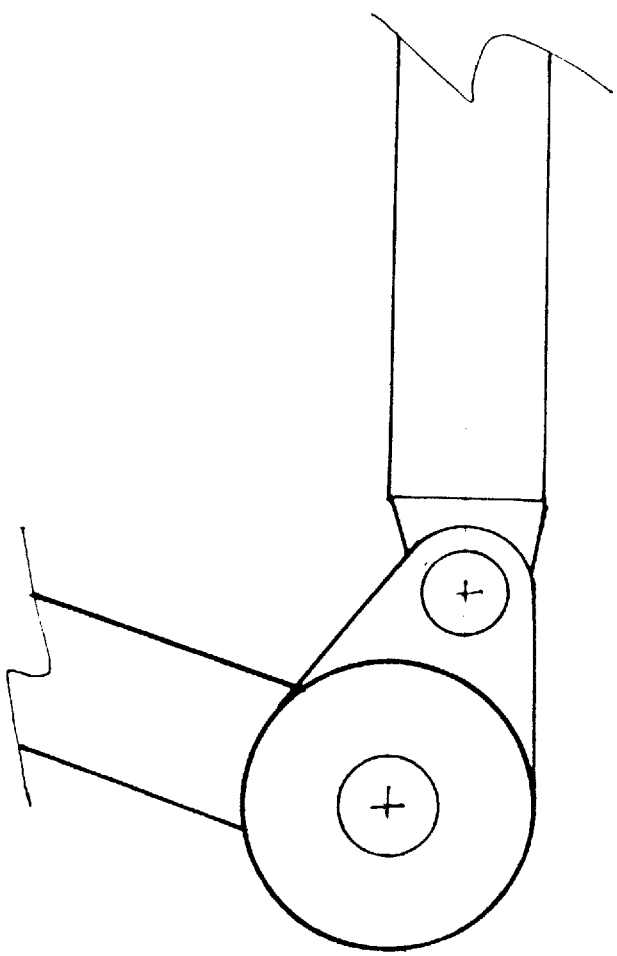
FIG. 9 is an enlarged side view of the articulation between the crankshaft hub and the lower rear fork.
Figure 10:
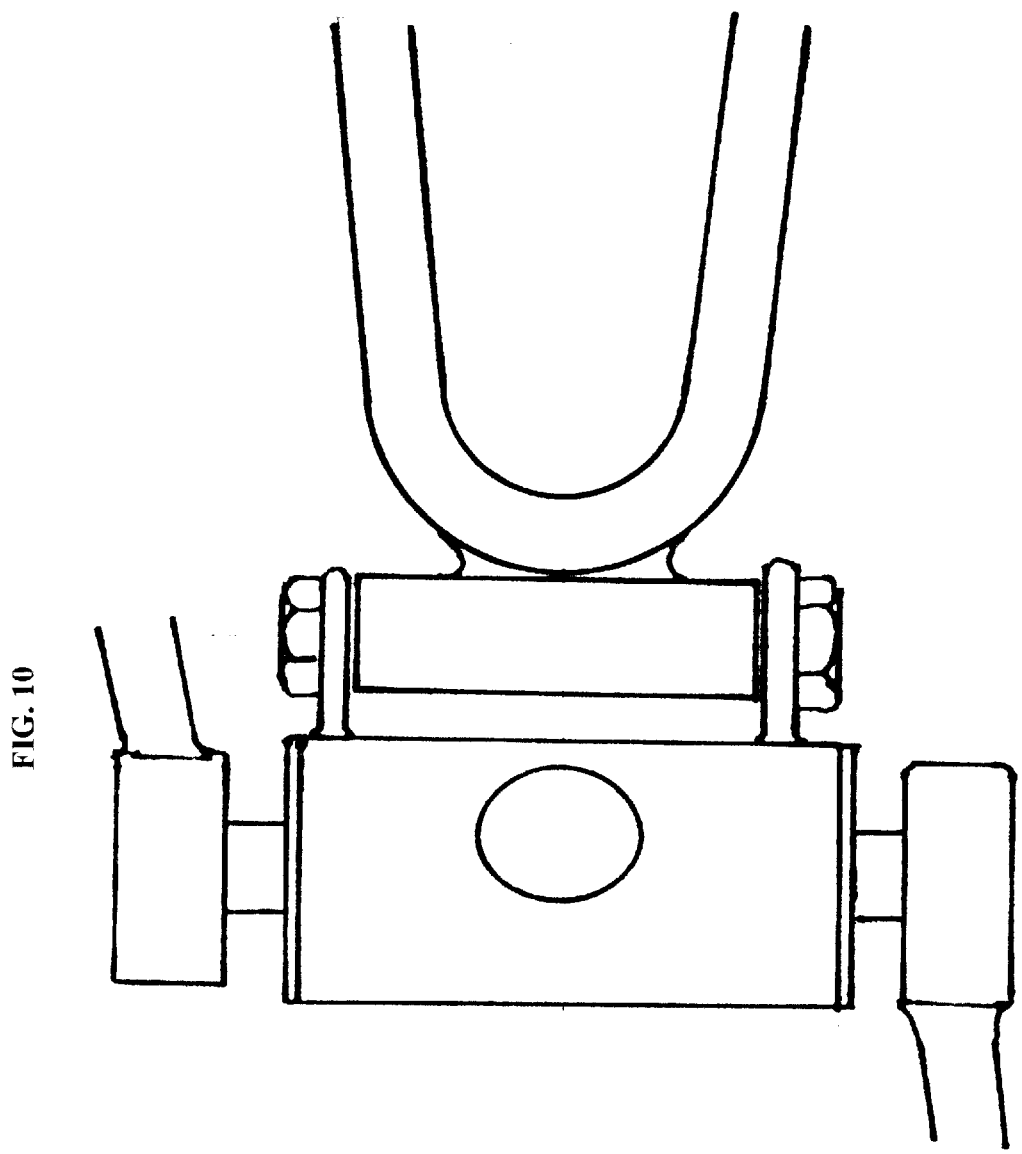
FIG. 10 is an enlarged plant view of the FIG. 9.
Figure 11:
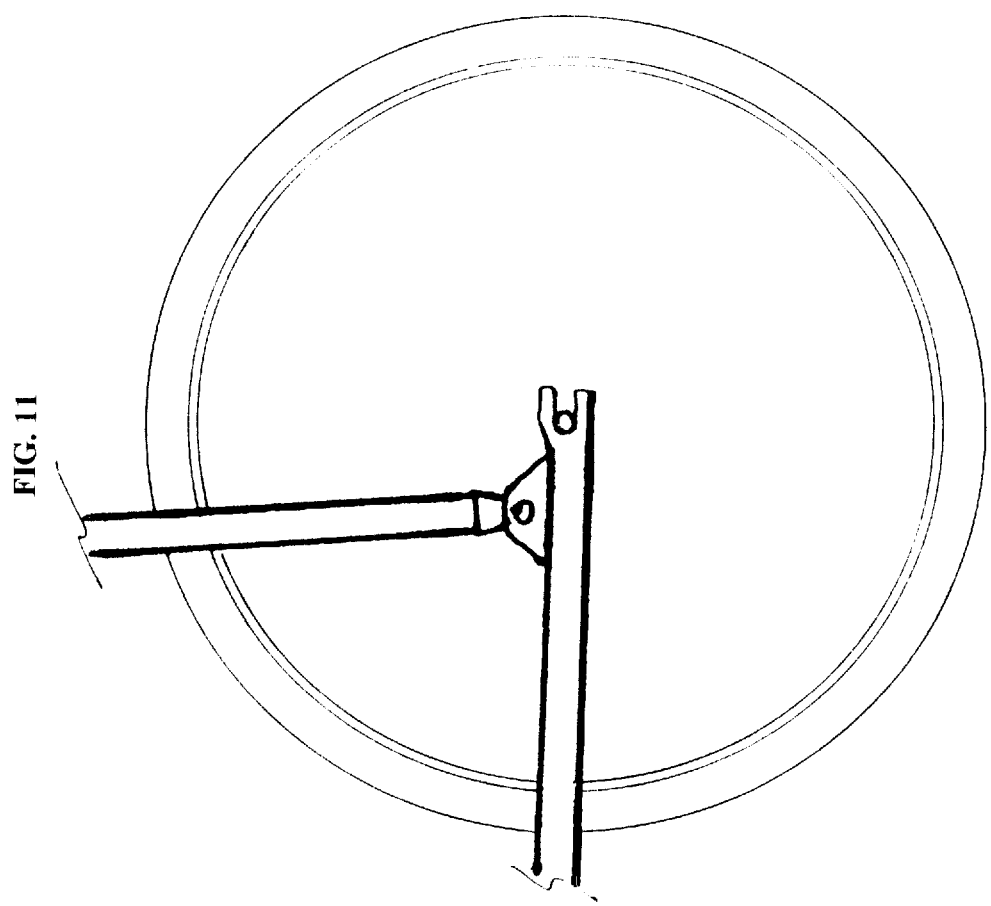
FIG. 11 is an enlarged side view of the articulation between the upper rear fork and the lower rear fork.
Figure 12:
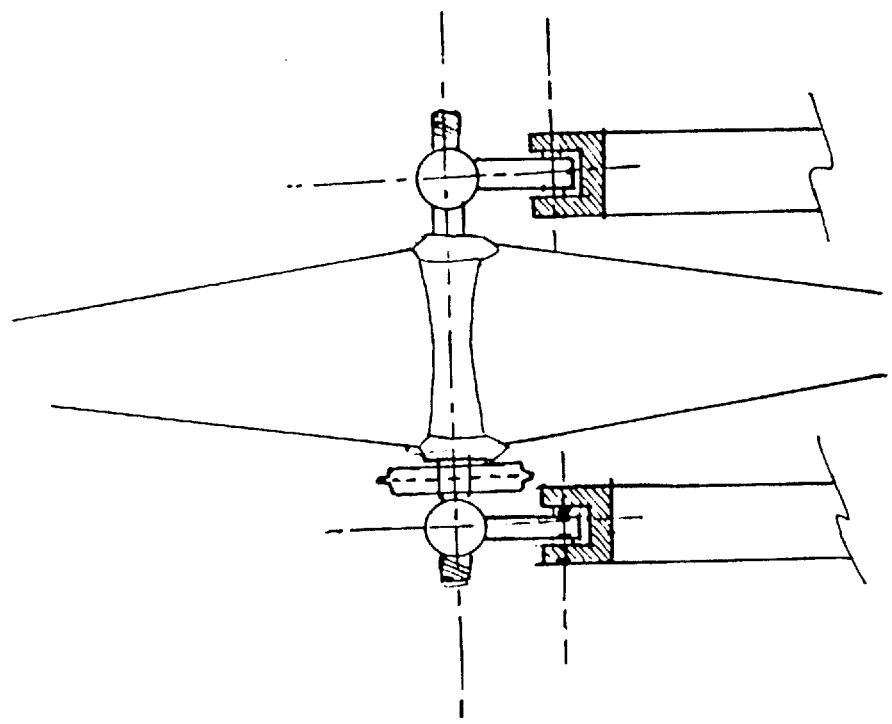
FIG. 12 is an enlarged plant view of the FIG. 11.
Figure 13:
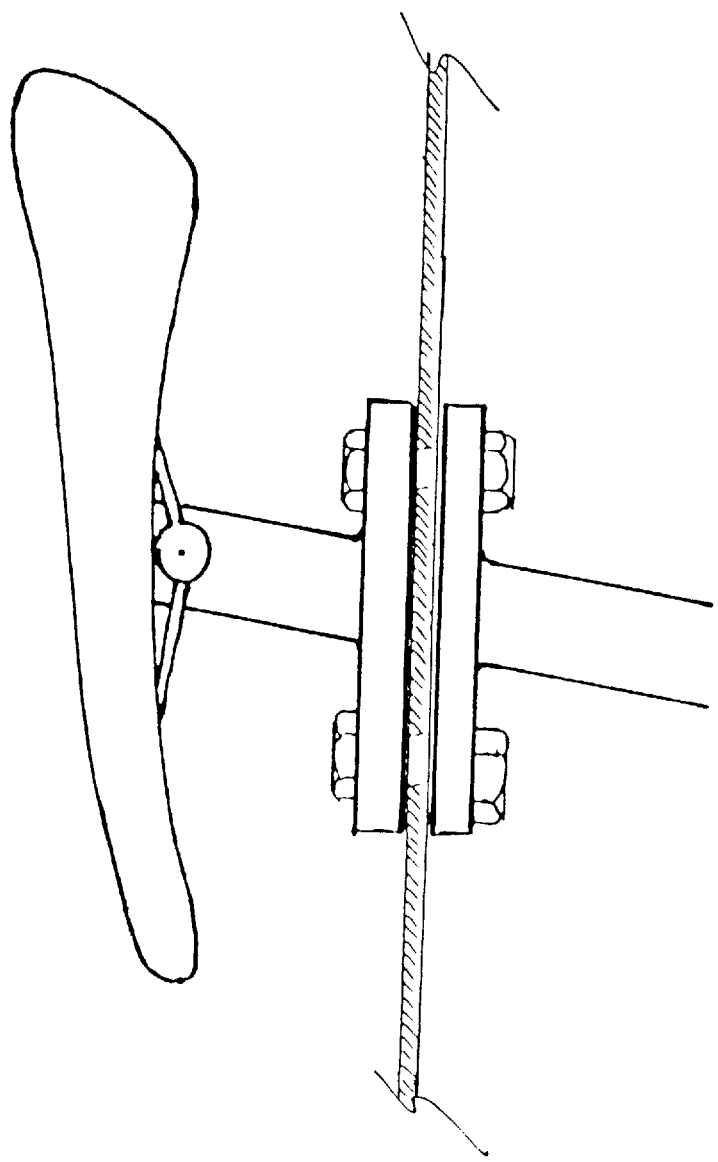
FIG. 13 is an enlarged side view of the embedding point.
Figure 14:
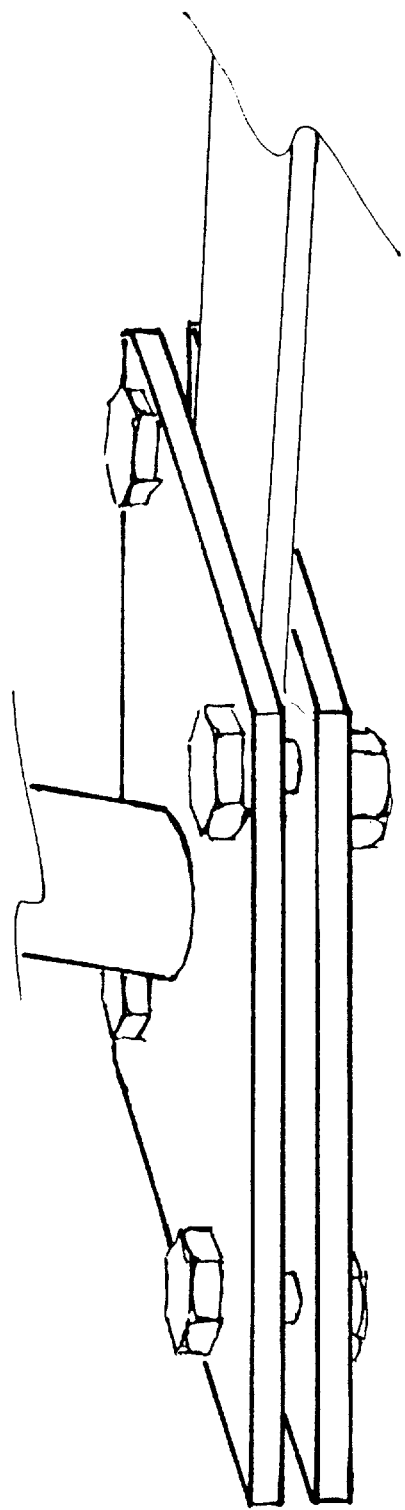
FIG. 14 is an enlarged perspective view of the FIG. 13.
Figure 15:
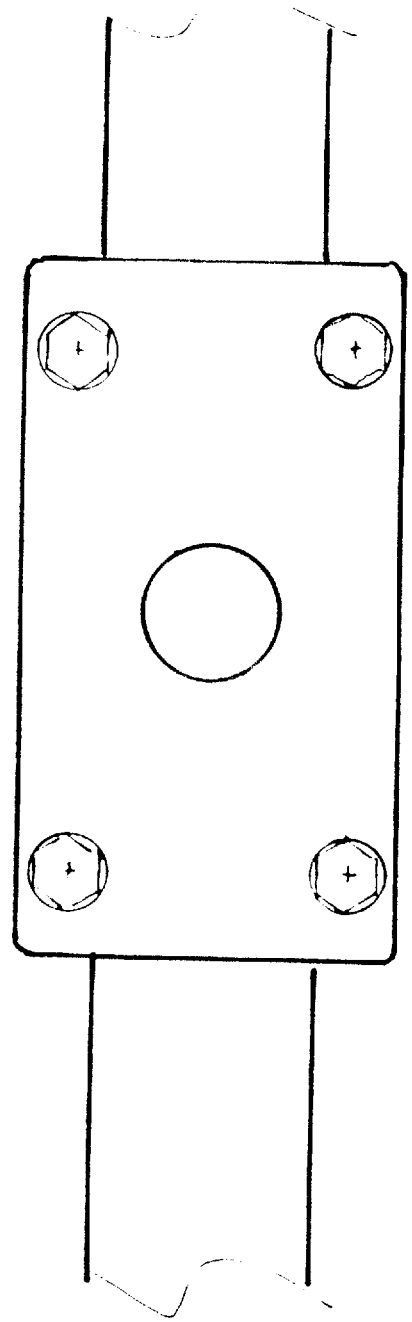
FIG. 15 is an enlarged plant view of the FIG. 13.

Referring to the drawing, a bicycle 10 embodying the present invention includes a novel bicycle frame 11 having an elastic top bar B, a steering tube T1 supporting a conventional front fork F connected to handlebars H in a conventional manner, a seat tube T2, a connecting tube T3, an upper rear fork F1, a lower rear fork F2, a rear wheel WR, a crankshaft hub C, and an embedding point E. The elastic top bar B acts as a connecting rod articulated at point A1 with the steering tube T1, and at point A2 with the upper rear fork F1. The elastic top bar B is made of high quality steel, the same kind as used in a car suspension device, having a section of 4 millimeters thick and 42 millimeters wide, having both resistance and resilience. In operation, the elastic top bar B acts as a bow, smoothly bending itself, allowing a gentle movement upward and downward. The elastic top bar B only admits flexion movements, it means that it neither can be shortened, lengthened nor torsioned. Its movements take place on an imaginary vertical plane containing all of the elements making the frame.

The steering tube T1 is a rigid tube that acts as a connecting rod articulated at point A1 with the elastic top bar B, and at point A3 with the connecting tube T3.

The seat tube T2 is a rigid tube acting as a connecting rod articulated at point A4 with the connecting tube T3, and at point A6 with the lower rear fork F2. The seat tube T2 includes a bottom portion having a crankshaft hub C. The seat tube T2 is embedded to the elastic top bar B at point E. This embedding point E is particularly important in that provides complete stability to the system, avoiding forward and backward movements of the frame in relation to the wheels, since the angle between the tangent to the elastic top bar B at point E and the seat tube T2 remains constant. Failure at the embeddiment should result in the frame closing over itself in a scissors-like movement.

The steering tube T1, the connecting tube T3, the seat tube T2 and the elastic top bar B makes a front deformable parallelogram, so the set of steering tube T1, front fork F and handlebars H moves in a parallel-to-itself way, allowing a very stable direction.

The connecting tube T3 is a rigid tube that acts as a connecting rod articulated at point A3 with the steering tube T1, and at point A4 with the seat tube T2.

The upper rear fork F1 acts as a connecting rod articulated at point A2 with the elastic top bar B, and at point As with the lower rear fork F2.

The lower rear fork F2 acts as a connecting rod articulated at point AS with the upper rear fork F1, and at point A6 with the crankshaft hub C.

The elastic bar B, the upper rear fork F1, the lower rear fork F2 and the seat tube T2 makes a second deformable quadrilateral (not necessarily a parallelogram), allowing the oscillation of the rear wheel WR around ist own articulation on the crankshaft hub.

In operation, when a force or a shock is transmitted to the front wheel, the elastic top bar B flexes and the steering tube T1 moves parallel to itself preserving the manageability of the bicycle. Identically, when a force or shock is transmitted to the rear wheel, the elastic top bar B flexes in a movement totally independent from the front wheel.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

Having described the nature and scope of the present invention, I hereby claim the patent of invention of:

1. A bicycle frame comprising:

an elastic top bar being flexible all along, a steering tube including a first end articulated to said elastic top bar and including a second end articulated to a connecting tube, said connecting tube including a first end articulated to said steering tube at a second end and including a second end articulated to a seat tube, said seat tube including an embeddiment to said elastic top bar, having a crankshaft hub secured thereto, and including an articulation to said connecting tube at said second end, making a front deformable parallelogram between said seat tube, said connecting tube, said steering tube and said elastic top bar allowing oscillations absorbing shocks transmitted therebetween, a crankshaft hub including an articulation to a lower rear fork, said lower rear fork including a first end articulated to said crankshaft hub, and including a second end articulated to an upper rear fork, and said upper rear fork including a first end articulated to said lower rear fork, and a second end articulated to said elastic top bar, making a rear deformable quadrilateral between said upper rear fork, said lower rear fork, said seat tube, and said elastic top bar allowing oscillations absorbing shocks transmitted therebetween.

* * * * *